(12) United States Patent
Burke et al.

(10) Patent No.: US 7,365,956 B2
(45) Date of Patent: Apr. 29, 2008

(54) PLASMA DRIVEN, N-TYPE SEMICONDUCTOR, THERMOELECTRIC POWER SUPEROXIDE ION GENERATOR WITH CRITICAL BIAS CONDITIONS

(76) Inventors: Douglas Burke, 2507 Port Whitby, Newport Beach, CA (US) 92660; Surya G. K. Prakash, 3412 Casco Ct., Hacienda Heights, CA (US) 91745

( * ) Notice: Subject to any disclaimer, the term of this patent is extended or adjusted under 35 U.S.C. 154(b) by 0 days.

(21) Appl. No.: 11/227,634

(22) Filed: Sep. 15, 2005

(65) Prior Publication Data
US 2006/0011465 A1    Jan. 19, 2006

Related U.S. Application Data

(63) Continuation-in-part of application No. 10/867,296, filed on Jun. 14, 2004, now abandoned.

(51) Int. Cl.
*H01T 23/00* (2006.01)
(52) U.S. Cl. .................................................. 361/230
(58) Field of Classification Search ............... 361/230
See application file for complete search history.

(56) References Cited

U.S. PATENT DOCUMENTS

| | | | | |
|---|---|---|---|---|
| 4,029,520 A | * | 6/1977 | Hampl, Jr. | .................. 136/205 |
| 4,353,069 A | * | 10/1982 | Handel et al. | .................. 342/1 |
| 4,475,994 A | * | 10/1984 | Gagne et al. | ................ 205/635 |
| 4,516,043 A | * | 5/1985 | Vigil et al. | .................... 310/11 |
| 4,801,359 A | * | 1/1989 | Jeanne et al. | ................ 205/354 |
| 5,162,136 A | * | 11/1992 | Blum et al. | .................. 427/226 |
| 2003/0012718 A1 | * | 1/2003 | Josephson et al. | ........... 423/241 |
| 2004/0007000 A1 | * | 1/2004 | Takeda et al. | .................. 62/78 |
| 2004/0183173 A1 | * | 9/2004 | Fujimoto et al. | ............ 257/678 |

FOREIGN PATENT DOCUMENTS

CH        666372 A5 *  7/1988
JP   2002124707 A  *  4/2002

\* cited by examiner

*Primary Examiner*—Michael Sherry
*Assistant Examiner*—Ann T. Hoang

(57) ABSTRACT

A plasma is generated inside a barrier enclosure made specifically of N-Type semiconductive material, said plasma thus generating a thermal gradient across said barrier which drives electrons through said barrier via the thermoelectric power of said N-Type semiconductor, said electrons thus being liberated on the opposing side of said barrier where they interact with oxygen in the air to form the superoxide ion, $O_2^-$, and a second electrode on said opposing being at a critical minimum negative bias potential to quench collateral production of positive ions and ensuring production only of negative, $O_2^-$, ions.

28 Claims, 3 Drawing Sheets

Figure 1:
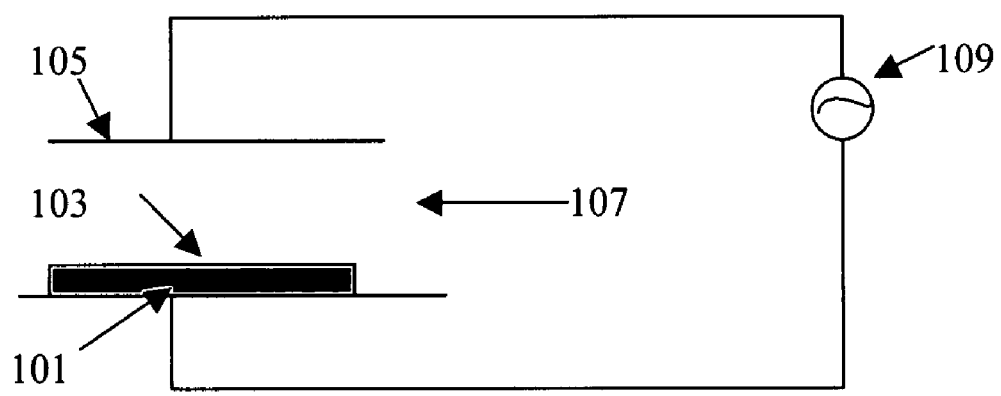

PLASMA DRIVEN, N-TYPE SEMICONDUCTOR, THERMOELECTRIC POWER SUPEROXIDE ION GENERATOR WITH CRITICAL BIAS CONDITIONS

This is a continuation in part of my earlier application Ser. No. 10/867,296, filed Jun. 14, 2004, now abandoned.

FIELD OF THE INVENTION

The proposed invention is a means of generating ions in the air at atmospheric pressure. In particular the species of ion generated is the superoxide ion, $O_2^-$. The superoxide ion being the desired species because of its ability to accommodate the benefit of cleaning the air. Simultaneously, the superoxide ion, $O_2^-$ does not have the harmful effects of ozone, $O_3$, to humans. The proposed invention is capable of producing only negative ions and zero positive ions. The means of doing this is novel and unobvious. Also the proposed invention can produce a predetermined ratio of positive and negative ions.

BACKGROUND OF THE INVENTION AND PRIOR ART

There are various and sundry means of generating oxygen species ions. These involve arc discharge through the air. An early discourse on such discharge phenomenon is found in the text, "The Discharge of Electricity Through Gases," Charles Scribner's Sons, New York: 1899. S. S. Thompson, "Lord Kelvin." Another text is "Fundamental Processes of Electrical Discharge in Gases," Leob, Leonard, B., John Wiley and Sons, 1939.

A more recent text, "Spark Discharge" by Bazelyan et al; explains the phenomenon of streamers quite nicely. The problem in discharging electricity through air is that air is stubborn. It takes energy to start the arc which results in a type of avalanche breakdown. This avalanche breakdown produces as arc in which electrons have a lot of energy. This is undesirable because these electrons can cleave molecular oxygen, $O_2$, in half to produce atomic oxygen, O. This atomic oxygen can then react with molecular oxygen to produce ozone. Ozone is unwanted because of its proposed harmful effects to humans.

The proposed invention liberates electrons into the air at a low energy. Avalanche dielectric breakdown of the air is absent. The superoxide ion is formed in abundance as opposed to ozone.

Techniques of producing ions in air usually involve a sharp needlelike electrode. At the tip of such a needle the electric field gets very high and dielectric breakdown occurs. These needles can be coated with platinum and gently pulsed to limit ozone production. As a result, superoxide ion generation is also limited. Further, the small surface area of the needle head limits ion production.

Needlelike electrodes in ionization devices are ever present. For pending art see US Patent App. No, 20040025695 to Zhang at al. Therein find discussion of a plurality of wires and ground plates at high voltage to produce dielectric breakdown of the air and thus generate ions. Also is found a discussion of the point ionizer. Both of these techniques involve high voltage exposed to the raw air to produce ions. These devices however also produce ozone. The high voltage arcing through the raw air produces ozone because of the phenomenon of avalanche.

Pulsed corona discharge microwave plasma, and dielectric barrier discharge devices are all reviewed in detail in "Prospects for non-Thermal atmospheric plasmas for pollution abatement", McAdams, J. Phys. D.: Applied Physics, 34 (2001) 2810-2821.

The pulsed corona discharge and the microwave discharge device involve passing the raw air through the corona and or plasma. This will produce ozone. This is why these devices clean the air, ozone being a powerful oxidant. However, if there are no contaminants in the air the ozone does not get used and itself is a contaminant.

The dielectric barrier discharge device DBD shown in FIG. 1, referring to FIG. 1, find a first electrode, 101, a dielectric barrier, 103, a second electrode, 105, a region between the insulating dielectric barrier and the second electrode where air can pass, 107, and a power supply, 109.

In the dielectric barrier or silent discharge regime, one of the two electrodes has an insulating coating on it and an alternating current (ac) voltage is applied between the electrodes. The microdischarges occur between the insulating surface and the opposing electrode. These microdischarges have a duration of ~1-10 ns and are self-quenching. They appear as spikes on the current waveform. For a given applied voltage, the capacitances of the insulating layer and the gap between the layer and the opposing electrode together with the applied frequency determine the power dissipation. Such dielectric barrier discharges have formed the basis of commercial ozone generators, with the ozone being used for water treatment for example.

The proposed invention is primarily not a dielectric barrier discharge device. In one of its permutations it has a plasma in an enclosed volume and the barrier is a specific material to execute specific phenomenon. In yet another embodiment the enclosure has its outer surface held at a specific potential to achieve specific results.

The short discharge pulses in region, 107, have a lot of energy and split molecular oxygen in half to the end of producing ozone.

The proposed invention has a specific bias circuit on its outer electrode which when applied to a DBD device can reduce the ozone output of the device and increase its negative ion output. Thus in one of its embodiments it represents an improvement to all DBD devices.

Ion tubes which generate ions and or ozone have been manufactured and used for many years. The bentax tube was reviewed in my earlier U.S. application Ser. No. 10/867,296. Other ion/ozone tubes are disclosed in U.S. Pat. No. 1,793, 799 to Hartman (1931), U.S. Pat. No. 1,064,064 to Franklin (1913), U.S. Pat. No. 3,905,920 to Botcharoff, U.S. U.S. Pat. No. 361,923 to Brian (1887). These devices lack the novelties of the proposed invention in that the enclosure of the tube is not specified to be an N-type semiconductor. Also the critical bias potential of the secondary electrode which is present in the proposed invention is absent in these earlier tubes.

Other means of generating negative ions include irradiating a conductor with an ultraviolet lamp to liberate electrons via the photoelectric effect. This method is employed in U.S. Pat. No. 3,128,378 to Allen et. al., U.S. Pat. No. 3,335,272 to Dickinson et. al., and U.S. Pat. No. 3,403,252 to Nagy. The proposed invention does not employ the photoelectric effect not the use of ultraviolet light. The ultraviolet light can produce ozone, $O_3$, as well as atomic oxygen, O, both of which are undesirable.

BRIEF DESCRIPTIONS OF DRAWINGS

FIG. 1: Schematic of dielectric barrier discharge device
FIG. 2: Schematic of plasma enclosure barrier and electrode position
FIG. 3: Driving circuit schematic

OBJECTS AND ADVANTAGES

Accordingly several objects and advantages of the proposed invention are:

(a) The proposed invention comprises a plasma bound by a barrier wherein electrons are transported through the barrier by virtue of the thermoelectric power of the barrier. The barrier is an N-Type semiconductor instead of a P-Type semiconductor.

The charge carrier of the barrier in the proposed invention is the electron. It is possible to get a higher current of electrons through such a barrier than sodium ions through the P-Type barrier of the prior art. A higher current of electrons translates into a production of more superoxide ions.

(b) The primary mechanism of ion production is electron transport through the glass. The electron appears at the surface with a low energy. It collides with $O_2$ molecules and they capture it to become superoxide, $O_2^-$. The energy input into the device goes onto heating the plasma to create the temperature gradient that drives electrons through the glass. The energy is not used to generate dielectric barrier discharge, which can generate ozone. Thus the proposed invention generates about ten times less ozone per unit energy input into the device that is for equal voltages and thickness of barrier. At the same time it produces about ten times more superoxide ions.

(c) The primary mechanism of ion production is the transport of electrons through the barrier. Thus a higher transport of electrons can be achieved by floating the inner electrode at a negatively biased DC offset. This establishes a net electric field across the barrier that does not time average out to zero. There is a net electric field producing a net force on electrons. This additional force increases the electron diffusion through the barrier which gives rise to more ions.

(d) In the proposed invention it is electron transport through the barrier and onto the surface of the tube that produces ions. The temperature gradient across the barrier pushes the electrons through the barrier. Thus increasing the temperature gradient can increase the ion production. Driving the plasma at the plasma frequency maximizes the temperature of the plasma. This is a critical resonant condition that results in an improvement of the ion output. The critical resonant frequency is a function of the density of the gas inside the tube and the partial ionization of the plasma.

(e) The inner electrode of the plasma in the proposed invention can be floated at a negative bias D.C. offset below ground. This serves to provide means for the device to produce mostly negative ions. The negative D.C. offset provides an electric field that drives more electrons through the glass. More electron transmission gives rise to more ion production.

(f) A novel unobvious improvement of my earlier application is that a critical offset voltage has been discovered for the secondary electrode which makes the device produce positive ions, thus only negative ions are produced.

(g) The critical offset voltage can then be made to vary with time at resonant ion production frequencies.

DETAILED DESCRIPTION OF THE INVENTION

Figure 2:
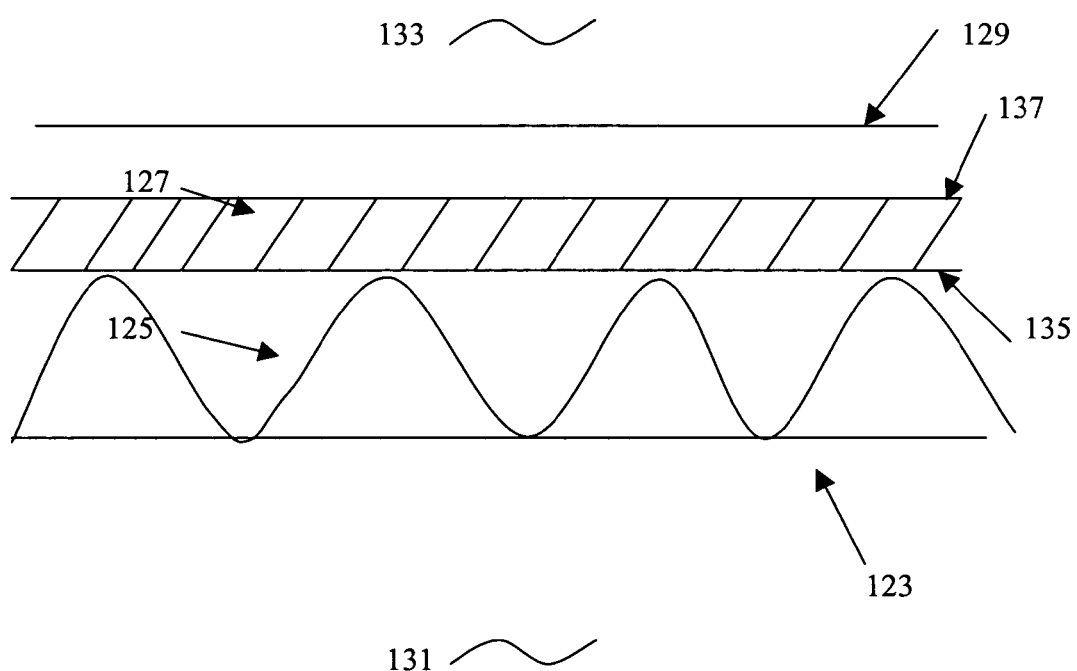

Referring to FIG. 2, the proposed invention comprises a first region containing a gas, 131, a first electrode permeable by said gas, 123, a plasma, 125, formed by exciting said first electrode with an AC voltage, a barrier, 127, which separates said first region, 131, from a second region, 133, and a second electrode, 129, and said second region being the open air of the room where the device is placed, and said barrier having an inner surface, 135, and an outer surface, 137.

Said barrier is a dielectric material whose dielectric breakdown limit is such that the voltage applied to said first electrode does not cause dielectric breakdown through said barrier.

In one embodiment the barrier is composed of a glass or ceramic composite material such as fiberglass, or G-10. The composite materials have extrinsic defects that create channels by which thermal electrons can leak through the barrier.

In another embodiment of the invention the barrier is composed of a borosilicate or soda lime glass that is coated with a thin layer of classical semiconductor.

In another embodiment the barrier is any of the known glass or ceramic materials that are N-Type semiconductors wherein the charge carrier is the electron. In another embodiment the barrier has a thin coating of a ceramic material like Yttrium doped zirconium oxide. The zirconium oxide layer serves to damp out the kinetic energy of electrons as they move through the barrier onto its surface.

A first group of electronically conducting glasses consist of oxide glasses with relatively large concentrations of transition metal oxides, such as vanadium phosphate glasses.

A second group of electron glasses consists of sulphides, selenides, and tellurides. These are known as the chalcogenide glasses. These glasses are semiconductors but their electronic conductivity is not critically dependent on trace impurities as it is in the classical semiconductors. However, with the transition metal oxide glasses there is generally a dependence on the degree of reduction or oxidation during melting; the conductivity is generally at a maximum for a certain ratio of oxidized to reduced valence state of the transition metal ion. (Linsley, G. S., Owen., A. E. and Hayatee, F. M. (1970). J. Non-Crystalline Solids, 4, 208.

Electronically conducting glasses have a definite thermoelectric effect. This has been observed by Mackenzie. [Mackenzie, J. D. (1964) "Modern Aspects of The Vitreous State", Vol. 3, p. 126. Butterworth. London.] The thermoelectric power of the barrier turns out to be important as will become obvious in the section on operations of the invention. The temperature gradient across the barrier is the dominant force that drives electrons through the barrier. This electron current is proportional to the product of the thermoelectric power of the material and the temperature gradient.

The first electrode, 123, is placed in close proximity to the inner surface, 135, of said barrier. It may be composed of a mesh material. It may also be deposited directly onto said surface but it must be done in a pattern, irregular or ordered, such that there are regions wherein the conductor is absent. One such example of a deposition of conductor would be a cross-hatched pattern. These arrangements allow for the plasma, 125, to be formed along the inner surface, 135.

The second electrode, 129, is in the like of the first electrode and its permutations. That is it has holes in it, it is metallic mesh, or it is deposited directly onto the outer surface, 137, of said barrier. If it is deposited directly it must have open regions as described of the first electrode.

This is so electrons coming to the surface can have some space to move before they hit the second electrode. This allows time for them to be picked up by oxygen molecules in said second region thereby generating the superoxide ion, $O_2^-$.

The second electrode, 129, is held at a critical bias potential of at least −230 Volts. This negative voltage on the second electrode quenches the production of positive ions. It is unusual that this voltage is only −230 Volts. The second electrode is desired to be set at ground because it is exposed to the air. Sine the −230 Volts is not a "high voltage" it can be applied to the second electrode safely. Namely, if it is applied with a power supply that cannot put out more than 1 mA it is still safe to be touched by human hands without danger. The second electrode's voltage can also be made sinusoidal and negatively biased. This enhances the production of ions.

Figure 3:
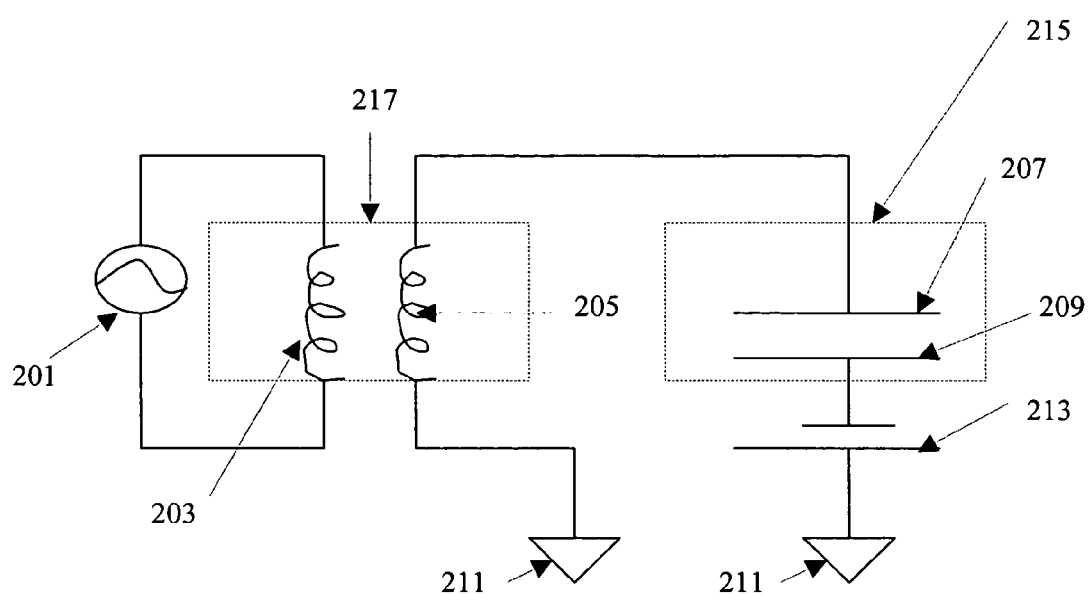

Referring to FIG. 3 a circuit is shown to drive the ion generator. The first electrode is shown as, 207, and the second electrode is shown as, 209. The electrodes 207 and 209 constitute a capacitor, 215. The capacitor has a DC capacitance, $C_o$. The circuit is excited by the sinusoidal source, 201. The voltage is applied to a transformer, 217, which has a primary, 203, and a secondary, 205. The secondary has DC inductance, $L_o$. The second electrode, 209, is held at its offset voltage by means of a power supply or battery, 213. The secondary, 205 has its one lead connected to ground, 211, and the other lead connected to the first electrode, 207. The power supply, 213, applies its voltage to the second electrode, 209, with respect to ground, 211. This circuit supplies AC high voltage to the first electrode by way of the transformer, 217, whose secondary coil, 205, has a DC inductance, $L_o$. The invention operates optimally when the frequency of the circuit is in the range, $$f^* = (.9 - 1.3) \frac{1}{\sqrt{2\pi L_o C_o}}$$

The bias potential supplied by the power supply, 213, can be made variable. That is it can be made adjustable so it can be varied at will between ground and a nominal negative voltage of at least −230 Volts. This allows one to create a predetermined mixture of positive and negative ions. When the invention is constructed with the barrier made of N-type semiconductor the positive ions are not harmful nitrogen ions or nitrogen-oxygen compound ions. They are rather protonated water, which is a welcome actor in the ion field.

A further optimum condition has been established. For a given AC voltage on the primary electrode the electron temperature of the plasma, 125, can be measured with the laser. From the temperature the fraction of ionization of the plasma can be determined. The plasma is usually only partially ionized unless the gas in the first region, 131, is at a low pressure. The equation that relates the temperature of electrons to the fraction of ionization is the Saha equation:

$$\frac{N_i}{N_n} \approx 2.4 \times 10^{21} \frac{T^{3/2}}{N_i} e^{-U_i/KT}$$

where:
$N_i$=ion density in particles per $m^3$
$N_n$=neutral particle density in particles per $m^3$
T=electron temperature as measured by laser scattering instrumentation
U:=(ionization potential for the gas in said first region)
K=Boltzmann's Constant Typically the plasma is excited at 60 Hz and the electron temperature, T, is measured with a laser scattering instrument. Once the quantities $N_i$ and $N_n$, are determined, the resonant frequency has been determined to be $$f_r = 9\sqrt{N_i}\left(\frac{N_i}{N_n}\right)$$

The factor, $9\sqrt{N_i}$ is simply the plasma frequency when the neutral particles are absent. The units are in Hz if the densities are in particles per $m^3$.

Let's do an example of a typical situation involving the invention. If the air in region one is nitrogen the ionization potential, Ui, is 14.5 e V. If the pressure in region one is 1 atm the total particle density $N_T$ is $3 \times 10^{25}$ particles per $m^3$. For small fractional ionization $N_t$ is approximately equal to $N_n$ and measuring T will give us $N_i$ directly. If we use a 60 Hz signal with voltage rms amplitude of 5 KV, T is in the order of a few thousand degrees and the fractional ionization $$\frac{N_i}{N_n}$$

is on the order of $10^{-6}$.
This gives an ion density of:
$N_i \equiv 10^{-6} \ N_n \equiv 10^{-6} \ N_T$
$N_i = 10^{-6} \ (3 \times 10^{25} \ part/m^3)$
$N_i = 10^{19} \ part/m^3$
With $N_n = 3 \times 10^{25}/m^3$ the expression for $f_r$ gives
$f_r = [9]\sqrt{30 \times 10^{18}} 10^{-6}$
$f_r = 500$ KHz If the frequency applied to the first electrode is produced by means of the circuit in FIG. 3, $L_o$ and $C_o$, can be chosen such that $f_r = f^*$. This provides yet another critical condition on the invention parameters that gives optimum performance. Since $f_r$ is a number, Lo, and Co can be chosen exactly.

OPERATION OF THE INVENTION

Referring to FIG. 2, a voltage is applied to said first electrode, 123, to form a plasma, 125. The plasma temperature is greater than the temperature in region two, 133. This establishes a temperature gradient across said barrier. Said barrier is an N-Type semiconductor wherein the majority charge carrier is the electron. Said barrier has a thermoelectric power, P. Thus the temperature gradient pushes electrons from the plasma through said barrier. The electrons appear on the surface of said barrier and interact with the molecular oxygen in said second region, 133. The free electrons plus molecular oxygen produce the superoxide ion, $O_2^-$. The negative bias on the second electrode, 129, repels the electrons so they do not disappear into the ground before they become $O_2^-$.

In the embodiment wherein said barrier is simply stated to be a dielectric barrier without N-type semiconductive properties, the mechanism is different. The oscillating internal fields in the plasma induce such fields on the surface of said second electrode. If said second electrode is at the critical negative potential, these induced fields eject electrons from said second electrode, generating ions.

We claim:

1. A system for producing superoxide ions in the air at atmospheric pressure comprising:
   a. an enclosed volume of gas, the inside of which comprises a first region, the outside of which comprises a second region, the boundary of which comprises a barrier between said first and second regions and said second region being atmospheric air, and,
   b. a first electrode in said first region in close proximity to the inner surface of said barrier such that a first subvolume between said first electrode and said barrier is established and is small compared to said enclosed volume whose boundary is defined by said barrier, and
   c. means for said gas in said first region to pass freely into said first subvolume between said first electrode and said barrier, one such means being holes in said first electrode or said first electrode being a meshlike structure, and
   d. a second electrode on the outer surface of said barrier, and
   e. said second electrode having holes so that gas in said second region can move to and from the outer surface of said barrier, and
   f. said barrier being a dielectric material, and
   g. means for holding said second electrode at a D.C. potential below ground, that is a negative D.C. potential, and
   h. means for applying an AC voltage of adequate amplitude and frequency to said first electrode to sustain a partially ionized plasma in said first subvolume, whereby electrons in said plasma diffuse through said barrier towards said second electrode, and
   i. the thickness of said barrier being thin enough that a plasma is generated in said first subvolume and thick enough so that dielectric breakdown does not occur in said barrier, and the interaction of said plasma with said barrier and said negatively biased second electrode and said atmospheric air in said second region thus producing negative ions in said second region.

2. The system of claim 1 wherein said second electrode is at a negative potential at least 230 volts below ground.

3. The system of claim 1 wherein said second electrode is at a negative potential between −230 volts and −500 volts below ground.

4. The system of claim 1 wherein said second electrode is at a negative potential between −230 volts and −1000 volts below ground.

5. The system of claim 1 yet further including means to adjust the potential of said second electrode between ground and −230 volts.

6. The system of claim 1 yet further including means to adjust the potential of said second electrode between ground and −500 volts.

7. The system of claim 1 yet further including means to adjust the potential of said second electrode between ground and −1000 volts.

8. The system of claim 1 wherein said barrier is composed of borosilicate glass.

9. The system of claim 1 wherein said barrier is composed of material selected from the group consisting of chalcogenide glasses, sulphides, selenides, and tellurides.

10. The system of claim 1 wherein said barrier is composed of a material selected from the group consisting of transition metal oxide glasses.

11. The system of claim 1 wherein said barrier is composed of a material selected from the group consisting of vanadium phosphate glasses.

12. The system of claim 1 wherein said barrier is composed of a material selected from the group consisting of transition metal oxide glasses wherein the ratio of oxidized valence state transition metal ions to the reduced valence state transition metal ions is adjusted so that the thermo electric power is at a maximum.

13. The system of claim 1 wherein said gas in said first region is selected from the inert gases.

14. The system of claim 1 wherein said barrier is composed of a soda lime glass with a coating of silicon carbide whose thickness is between 0.1 and 10 microns.

15. The system of claim 1 wherein said barrier is selected from the group consisting of composite glasses or ceramics.

16. The system of claim 1 wherein said barrier is composed of fiberglass, G9, or G10.

17. The system of claim 1 wherein said barrier is selected from the group consisting of composite glasses which are composed of glass embedded in an epoxy resin.

18. The system of claim 1 wherein said first electrode is deposited directly onto a portion of the inner surface of said barrier, such that a portion of said inner surface is without said electrode, one possible arrangement being a cross hatched pattern or any arrangement ordered or disordered.

19. The system of claim 1 wherein said first and second electrodes are deposited directly onto a portion of the inner and outer surface of said barrier, thus a portion of said inner and outer surfaces is without said electrode, one possible arrangement being a cross hatched pattern or any arrangement ordered or disordered.

20. The system of claim 1 wherein said second electrode is deposited directly onto a portion of the outer surface of said barrier, such that a portion of said outer surface is without said electrode one arrangement being a cross hatched pattern or any arrangement ordered or disordered.

21. The system of claim 1 wherein the means of applying an AC voltage to said first electrode is achieved by way of a sinusoidal source that drives a step up high voltage transformer with a secondary winding having a DC inductance, $L_o$, and said first and second electrodes having a DC capacitance, $C_o$, and said sinusoidal source having a frequency, f*, and, f* being between $$= \frac{.9}{2\pi \sqrt{L_o C_o}} \text{ and } \frac{1.3}{2\pi \sqrt{L_o C_o}}.$$

22. The system of claim 1 wherein the means of applying an AC voltage to said first electrode is achieved by way of a sinusoidal source that drives a step up high voltage transformer with a secondary winding having a DC inductance, $L_o$, and said first and second electrodes having a DC capacitance, $C_o$, and said first region having a gas with an average ionization potential, Ui, and said gas having a density, N at room temperature, and said system when excited with a 60 Hz AC voltage with rms amplitude greater than 1 kv on said first electrode with said second electrode being at a constant voltage, forming a plasma in said first subvolume, and said plasma having an electron temperature, T, as measured by known means, and said plasma being partially ionized, and said parameters, Ui, T, N, thus determining the ion density, Ni, of said plasma by the Saha equation:

$$\frac{N_i}{N} \approx \frac{2.4 \times 10^{21}}{N_i} T^{3/2} e^{-U_i/KT}$$

Wherein $N_i$ is the ion density in particles per cubic meter, and N is as said defined in units of particles per cubic meter, and T, is as said defined in units of degrees Kelvin, and, $U_i$ is as said defined in units of joules, and, K is Boltzmann's constant defined as $1.38 \times 10^{-23}$ joules per Kelvin, and thus, $N_i$, being determined by said means, and said sinusoidal source having a frequency, $f_r$, and $f_r$ being between $$.5\left(\frac{9N_i^{3/2}}{N}\right) \text{ and } 2\left(\frac{9N_i^{3/2}}{N}\right)$$

And $f_r$ having the units of hz, and once $f_r$ is chosen to be within said critical range Lo and Co being chosen such that $$\frac{1}{2\pi\sqrt{L_o C_o}}$$

approximately equal to $f_r$.

23. The system of claim 1 wherein said first and second electrodes having a DC capacitance, $C_o$, and said first region having a gas with an average ionization potential, Ui, and said gas having a density, N at room temperature, and said system when excited with a 60 Hz AC voltage with rms amplitude greater than 1 kv on said first electrode with said second electrode being at a constant voltage, forming a plasma in said first subvolume, and said plasma having an electron temperature, T, as measured by known means, and said plasma being partially ionized, and said parameters, Ui, T, N, thus determining the ion density, Ni, of said plasma by way of the Saha equation:

$$\frac{N_i}{N} \approx \frac{2.4 \times 10^{21}}{N_i} T^{3/2} e^{-U_i/KT}$$

Wherein $N_i$ is the ion density in particles per cubic meter, and N is as said defined in units of particles per cubic meter, and T, is as said defined in units of degrees Kelvin, and, $U_i$ is as said defined in units of joules, and, K is Boltzmann's constant defined as $1.38 \times 10^{-23}$ joules per Kelvin, and thus, $N_i$, being determined by said means, and said sinusoidal source having a frequency, $f_r$, and $f_r$ being between $$.5\left(\frac{9N_i^{3/2}}{N}\right) \text{ and } 2\left(\frac{9N_i^{3/2}}{N}\right)$$

And $f_r$ having the units of hz.

24. The system of claim 1 wherein said second electrode is supplied with an AC voltage with amplitude of at least 100 volts and said second electrode is held at a negative DC offset bias between −230 volts and −1000 volts.

25. The system of claim 1 wherein said second electrode is supplied with an AC voltage with amplitude of at least 100 volts and said second electrode is held at a negative DC offset bias between −230 volts and −1000 volts, and said AC voltage on said second electrode is at a frequency of at least 10 KHz.

26. The system of claim 1 wherein said second electrode is supplied with an AC voltage with amplitude of at least 100 volts and said second electrode is held at a negative DC offset bias between −230 volts and −1000 volts, and said AC voltage on said second electrode is at a frequency of at least 100 KHz.

27. The system of claim 1 wherein said second electrode is supplied with an AC voltage with amplitude of at least 100 volts and said second electrode is held at a negative DC offset bias between −230 volts and −1000 volts, and said AC voltage on said second electrode is at a frequency of at least 500 KHz.

28. The system if claim 1 wherein said first and second electrodes having a DC capacitance, $C_o$, and said first region having a gas with an average ionization potential, Ui, and said gas having a density, N at room temperature, and said system when excited with a 60 Hz AC voltage with rms amplitude greater than 1 kv on said first electrode with said second electrode being at a constant voltage, forming a plasma in said first subvolume, and said plasma having an electron temperature, T, as measured by known means, and said plasma being partially ionized, and said parameters, Ui, T, N, thus determining the ion density, Ni, of said plasma by way of the Saha equation:

$$\frac{N_i}{N} \approx \frac{2.4 \times 10^{21}}{N_i} T^{3/2} e^{-U_i/KT}$$

Wherein $N_i$ is the ion density in particles per cubic meter, and N is as said defined in units of particles per cubic meter, and T, is as said defined in units of degrees Kelvin, and, $U_i$ is as said defined in units of joules, and, K is Boltzmann's constant defined as $1.38 \times 10^{-23}$ joules per Kelvin, and thus, $N_i$, being determined by said means, and said sinusoidal source having a frequency, $f_r$, and $f_r$ being between $$.5\left(\frac{9N_i^{3/2}}{N}\right) \text{ and } 2\left(\frac{9N_i^{3/2}}{N}\right)$$

And $f_r$ having the units of hz, and said second electrode is supplied with an AC voltage with amplitude of at least 100 volts and said second electrode is held at a negative DC offset bias voltage between −230 volts and −1000 volts and said AC voltage supplied to said second electrode having a frequency approximately equal to $f_r$.

* * * * *